(12) United States Patent
　　　Deshmukh

(10) Patent No.: US 12,659,530 B2
(45) Date of Patent: Jun. 16, 2026

(54) PROFILE-BASED CHANNEL RECOMMENATIONS FOR NEW USERS OF A STREAMING SERVICE

(71) Applicant: DISH Network L.L.C., Englewood, CO (US)

(72) Inventor: Shailesh Deshmukh, Livermore, CA (US)

(73) Assignee: DISH Network L.L.C., Englewood, CO (US)

( * ) Notice: Subject to any disclaimer, the term of this patent is extended or adjusted under 35 U.S.C. 154(b) by 124 days.

(21) Appl. No.: 18/512,689

(22) Filed: Nov. 17, 2023

(65) Prior Publication Data

US 2025/0168432 A1　　May 22, 2025

(51) Int. Cl.
　　*H04N 21/25*　　　(2011.01)
　　*G06N 5/02*　　　(2023.01)
(52) U.S. Cl.
　　CPC ............. *H04N 21/252* (2013.01); *G06N 5/02* (2013.01)
(58) Field of Classification Search
　　CPC ........................ H04N 21/252; H04N 21/4755
　　See application file for complete search history.

(56) References Cited

U.S. PATENT DOCUMENTS

| | | | |
|---|---|---|---|
| 9,230,212 B2 | 1/2016 | Su | |
| 2012/0246161 A1* | 9/2012 | Murakami | ........... H04N 21/252 |
| | | | 707/E17.046 |
| 2016/0080815 A1* | 3/2016 | Ruffini | ............. H04N 21/41407 |
| | | | 725/46 |
| 2016/0283470 A1 | 9/2016 | Solomon et al. | |
| 2020/0112755 A1* | 4/2020 | Seshadri | ................ G06N 3/045 |
| 2022/0167053 A1 | 5/2022 | Greene et al. | |
| 2023/0297625 A1* | 9/2023 | Ojo | .......................... G06N 3/09 |

OTHER PUBLICATIONS

Shailesh Deshmukh et al., "Filtering Television Content Based on Viewer Classifications," U.S. Appl. No. 18/529,595, filed Dec. 5, 2023. (34 Pages).

* cited by examiner

*Primary Examiner* — Gigi L Dubasky
(74) *Attorney, Agent, or Firm* — Kipman T. Werking; Frontier IP Law PLLC

(57)　　　　　ABSTRACT

Described herein are method, systems, and media for recommending channels to a new user in a streaming service. In an embodiment, an exemplary method includes identifying, from a plurality of existing users of the streaming service, one or more existing users that each are similar to a new user of the streaming service based on their respective profiles; identifying one or more channels recommended to each of the one or more identified existing users; and displaying, on a streaming device of the new user, at least one channel of combined channels of the one or more channels recommended to each of the one or more identified existing users.

17 Claims, 7 Drawing Sheets

Calculate a similar score between a new node and each of the other nodes in a knowledge graph

403

Select the nodes by the similarity scores

405

Return the selected nodes

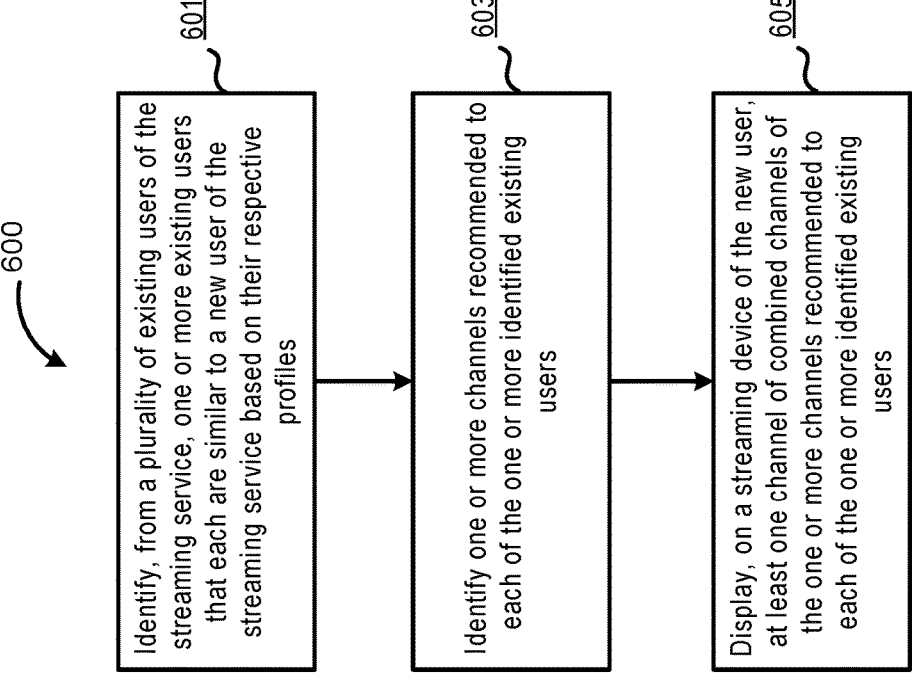

600

601

Identify, from a plurality of existing users of the streaming service, one or more existing users that each are similar to a new user of the streaming service based on their respective profiles

603

Identify one or more channels recommended to each of the one or more identified existing users

605

Display, on a streaming device of the new user, at least one channel of combined channels of the one or more channels recommended to each of the one or more identified existing users

FIGURE 6

PROFILE-BASED CHANNEL RECOMMENATIONS FOR NEW USERS OF A STREAMING SERVICE

TECHNICAL FIELD

The present disclosure relates to streaming services, and more particularly to a method and system for recommending channels of a streaming service to new users based on their profile similarities to existing users.

BRIEF SUMMARY

Recommender systems in a streaming TV service are used to generate personalized recommendations for users. Existing recommender systems typically use collaborative filtering, which works by identifying patterns and similarities between users and items, based primarily on users' interaction histories. However, collaborative filtering requires a preliminary interaction history in order to generate meaningful recommendations. This prerequisite creates a "cold start" dilemma, hindering new users from benefiting from personalized content recommendations.

Described herein are methods, systems, and media for recommending channels to a new user in a streaming service, which is an application-based television service that streams live television and on-demand content over the internet. These embodiments allow new users without sufficient watch history to receive channel recommendations based on their profile similarities to existing users.

In an embodiment, an exemplary method includes identifying, from a plurality of existing users of the streaming service, one or more existing users that each are similar to a new user of the streaming service based on their respective profiles; identifying one or more channels recommended to each of the one or more identified existing users; and displaying, on a streaming device of the new user, at least one channel of combined channels of the one or more channels recommended to each of the one or more identified existing users.

In some embodiments of the method, the new user is a user that signed up for the streaming service within a predetermined past period, and wherein each of the plurality of existing users signed up for the streaming service prior to the predetermined past period.

In some embodiments of the method, the identifying of the one or more existing users from the plurality of existing users further includes: identifying the one or more existing users on a knowledge graph representing the plurality of existing users and the new user.

In some embodiments of the method, the identifying of the one or more existing users on the knowledge graph further includes: calculating a similarity score for each of the plurality of existing users to the new user; and selecting the one or more existing users based on their respective similarity scores exceeding a predetermined threshold.

In some embodiments of the method, the identifying of the one or more existing users on the knowledge graph further includes: calculating a similarity score for each of the plurality of existing users to the new user; setting a threshold number of existing users to be selected; selecting a number of similarity scores that is equal to the threshold number; and determining existing users associated with the number of selected similarity scores.

In some embodiments of the method, the similarity score is calculated based on attributes of the new user and attributes of each respective existing user of the plurality of existing users, wherein the attributes of the new user or each existing user is included in their respective profiles.

In some embodiments of the method, the attributes of the new user or each existing user include one or more of: age, gender, income, ethnicity, marital status, subscription plan, or streaming device used.

According to other embodiments, the methods can be implemented by a system and/or a computer readable storage medium as described herein.

In an embodiment, the system can be a multi-node cloud system, where the operations for recommending channels to a new user in the streaming service can be distributed across multiple processing nodes to increase the system's scalability, fault tolerance, and performance in terms of processing speed of the system. Further, data related to the operations can be loaded into a distributed shared memory (DSM) to be accessed by multiple processing nodes. The DSM enhances the system's scalability since it allows more processing nodes to be added as more processing power is needed. As the system expands, it offers increased memory resources to the applications, boosting overall performance. Further, the DSM facilitates the efficient use of memory resources spread across different machines. If a node is grappling with high memory consumption, it has the capability to tap into the unused memory of other nodes, enhancing the adaptability of the cloud-based computing system.

As shown above and in more detail throughout the disclosure, various embodiments of the disclosure provide technical improvements over existing systems for recommending channels to new users in a streaming service. These and other features and advantages of the disclosure will become more readily apparent in view of the embodiments described herein and illustrated in this specification.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 2 is a block diagram further illustrating a content filtering system according to an embodiment of the disclosure.

FIG. 6 is a block diagram illustrating a process of recommending channels to new users according to an embodiment of the disclosure.

DETAILED DESCRIPTION

The following description, along with the accompanying drawings, sets forth certain specific details in order to provide a thorough understanding of various disclosed embodiments. However, one skilled in the relevant art will recognize that the disclosed embodiments can be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments can be methods, systems, media, or devices. Accordingly, the various embodiments can be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "In some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
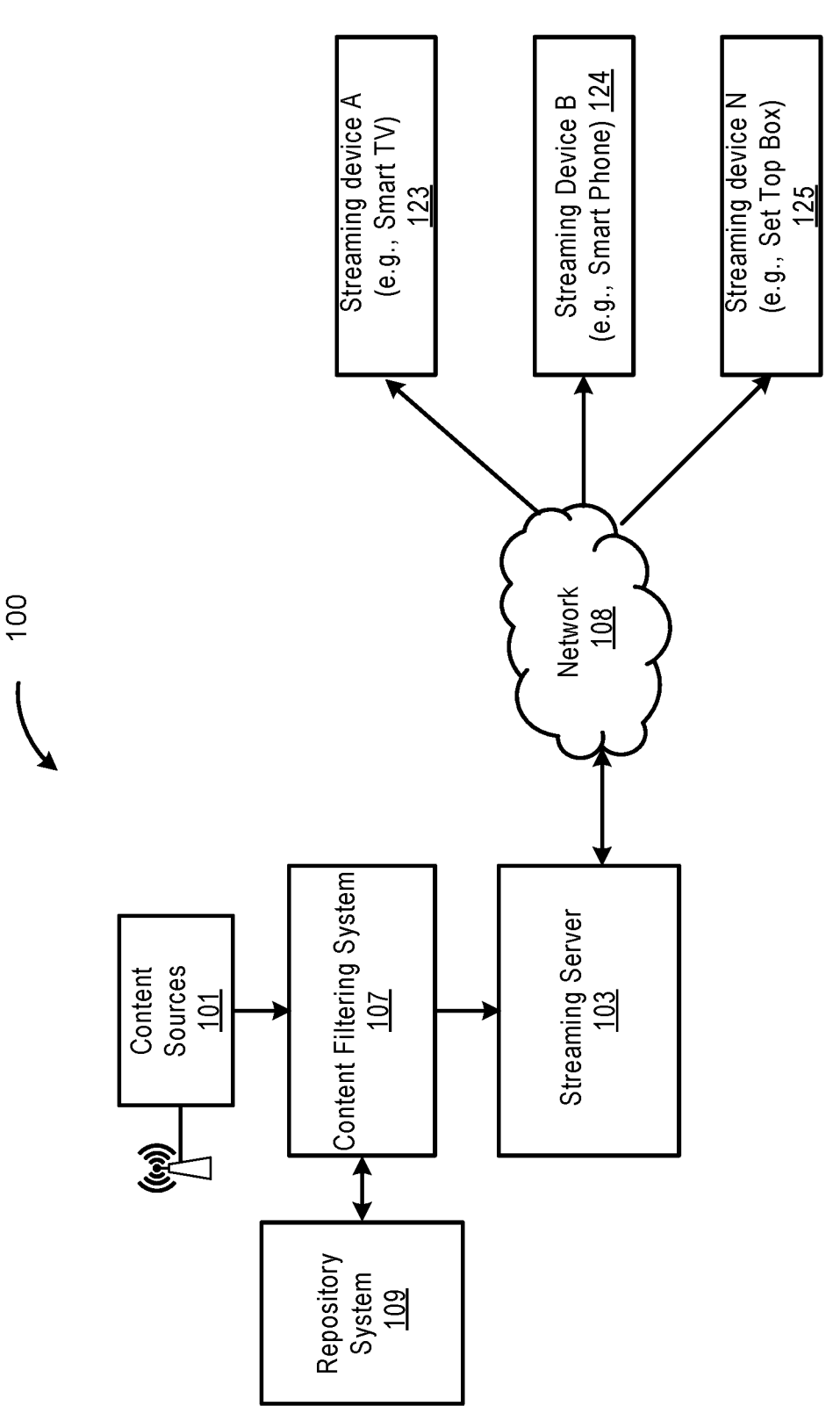
FIG. 1 is a block diagram illustrating an example of a media streaming system 100 in which embodiments of the disclosure are implemented.

FIG. 1 is a block diagram illustrating an example of a media streaming system 100 in which embodiments of the disclosure are implemented. The media streaming system 100 includes a streaming server 103 and a plurality of video streaming devices 123-125. The streaming server 103 receives media content from one or more content sources 101 and transmits that media content through the network 108 to the streaming devices 123-125 in the form of a data stream that can be received, processed, and presented to the user at the streaming devices 123-125.

The content sources 101 can be any type of media content source, including media providers, content aggregators or distributors such as a cable television system operator, a direct broadcast satellite (DBS) system operator, satellite radio operator, or simply a network service provider or the like. These content sources 101 can provide the media content to the streaming server 103 in any suitable form and by any suitable technique. For example, the media content can be provided via satellite, fiber optic or any other conventional wireless or physical media for transmitting signals. The transmitted signals can be received, demodulated and decoded as needed by any appropriate receiver(s) to extract program signals. The extracted programming signals can then be analyzed as appropriate to identify the program contents. A distributor/aggregator, for example, may encode the extracted signals for distribution on a digital network, for aggregation and redistribution of signals over a DBS or cable distribution system, for generating content stored on a remote storage digital video recorder (RSDVR) or video on demand (VOD) service, or for any other purpose.

This content can then be passed to the streaming server 103. Having received this content, the streaming server 103 can encode the received content into a suitable format for streaming to the streaming devices 123-125. For example, the streaming server 103 can transmit an encoded data stream via a content delivery network (CDN) for distribution on the network 108 (e.g., the Internet) as part of an RSDVR, VOD or other media streaming service. The media streams are thus transmitted to the streaming devices 123-125.

As some specific examples, each of the streaming devices 123-125 can be implemented with any suitable computing device, including laptops, tablets, virtual reality (VR) devices, and mobile communication devices (e.g., smart phones). Such devices may include an integrated display screen, may be coupled to a separate display screen, or may not include a display screen for audio only devices.

Each of the streaming devices 123-125 includes a combination of hardware and/or software needed to receive, process, and play the video streams received from the streaming server 103. Each streaming device can include device hardware, an operating system, a streaming application, one or more non-streaming applications, and streaming support features.

The operating system can be any operating system compatible with the type of streaming service on which the operating system is installed. For example, the operating system can be Android, IOS, or Samsung One UI if the streaming device 124 is a smart phone. The streaming application can be any streaming applications, for example, Netflix, Hulu, YouTube TV, and Sling TV. Although the figure shows one streaming application on the streaming device 124, multiple streaming applications can be installed on each of the streaming devices 124-125. The streaming support features can be software components providing support functions for the streaming application. For example, the streaming support features can include a "Guide" feature and a "Watch on Demand" feature. These streaming support features can be disabled without impacting the basic functions of the streaming application; they are provided to enhance users' streaming experiences.

For example, the "Guide" feature provides users with an interactive program guide (EPG—Electronic Program Guide) that displays a schedule of the available channels and their programming for an extended period of time, usually up to a week or more into the future. Users can browse through the guide to see what is currently airing, what is coming up, and plan their viewing schedule. It helps users find and select live TV channels and programs. As another example, the "Watch on Demand" feature allows users to access a library of on-demand content. This content includes a variety of movies, TV shows, and other video content that users can watch at their convenience. Instead of being tied to a specific broadcast schedule, users can select content from the On Demand library and watch it whenever they want. This feature adds flexibility to the viewing experience, allowing users to catch up on missed episodes or explore a wide range of content.

The non-streaming applications can be any other applications on a streaming device, such as games, instant messaging applications, fitness tracking applications, music applications, and travel applications.

As further shown, the media streaming system 100 includes a content filtering system 107, which may be a software module, software component, or a separate server. The content filtering system 107 is configured to recommend content items (channels or programs from a particular channel) to new users that do not have sufficient watch history for a collaborative filter to provide recommendations. The content filtering system 107 can locate existing users who are similar to a new user based on their profiles stored in a repository system 109, which can be any type of storage, such as a relational database and a NoSQL database.

Figure 2:
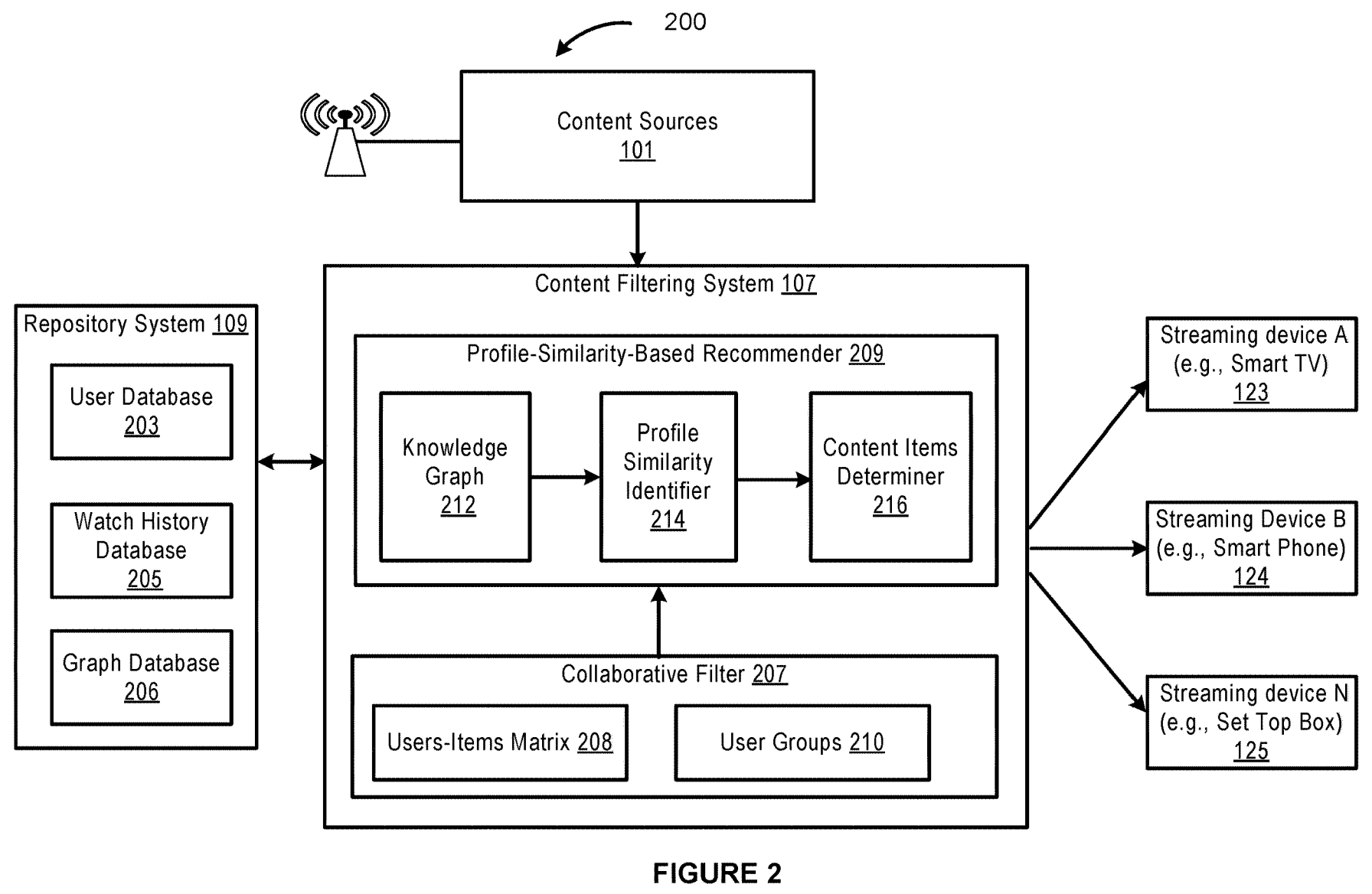

FIG. 2 is a block diagram further illustrating the content filtering system 107 according to an embodiment of the disclosure.

As shown, the content filtering system 107 includes a collaborative filter 207 and a profile-similarity-based recommender 209. The collaborative filter 207 is configured to perform collaborative filtering while the profile-similarity-based recommender 209 is configured to find users that are similar to a particular user in terms of their profiles and then recommend content items to the particular user based on content items recommended to the similar users by the collaborative filter 207.

In an embodiment, the collaborative filter 207 can be implemented using a machine learning model trained to recommend content items to users based on the preferences of other users with similar tastes. The collaborative filter 207 can include a users-items matrix 208, which can be a table that shows how each user has rated or interacted with each content item. The ratings can be explicit, such as star ratings, or implicit, such as clicks, views, or purchases. The collaborative filter 207 then uses the users-items matrix 208 to identify groups of users 210 with similar tastes using a variety of methods, such as Pearson correlation or cosine similarity. Once the groups of users 210 have been identified, the collaborative filter 207 can recommend items to a user based on the ratings of the users in their group.

For instance, if a user has given high ratings to several movies that other users in their group have also rated highly, the collaborative filter 207 can recommend other movies to the user that are similarly highly rated by those users in the group.

The collaborative filter 207 can use a memory-based filtering algorithm or a model-based filtering algorithm. The memory-based collaborative filtering algorithm (also referred to as neighborhood-based collaborative filtering) directly taps into the users-items matrix 208 to generate recommendations. In one embodiment, under the memory-based filtering algorithm, the collaborative filter 207 can use a user-user method or an item-item method. According to the user-user method, the collaborative filter 207 can recommend content items to a user based on the similarity between that user and other users in a group. According to the item-item method, the collaborative filter 207 can recommend content items based on the likeness of items. On the other hand, the model-based collaborative filtering algorithm involves constructing a predictive model using the users-items matrix 208. Once this model is constructed, it is used to predict user preferences, making direct use of the users-items matrix 208 unnecessary during recommendation.

As shown, the profile-similarity-based recommender 209 can include a knowledge graph 212, a profile similarity identifier 214, and a content items determiner 216. The knowledge graph 212 can represent users of a streaming service and may include the following information for each user: demographics (age, gender, ethnicity, income, work situation, marital status, etc.), subscription information (e.g., package selections, add-ons), subscription timing, preferred platforms (mobile device), and other relevant data. The knowledge graph 212 can be constructed using information from a user database 203 and a watch history database 205 of the users and can be stored in a graph database 206. In an embodiment, the knowledge graph 212 can be enriched using more user-specific information as each user's information is collected over time. Relationships within the knowledge graph can be weighted to reflect the strength of connections among users.

In an embodiment, the profile similarity identifier 214 can be configured to find existing users who are similar to a new user in terms of their profiles. As used herein, a new user is defined as a user that signed up for the streaming service within a past predetermined period of time, such as in the last 30 days, and an existing user is defined as a user that signed up for the streaming device prior to the past predetermined period of time. Also, as used herein, a profile of a user can include user information represented in the knowledge graph 212, such as the user's demographics, subscription information, subscription timing, preferred platforms, and other relevant data. The similarities between a new user and one or more existing users can be determined based on relationships and attributes of the users within the knowledge graph 212. In an embodiment, the top three most similar users can be selected as the similar users to a new user.

The content items determiner 216 can retrieve personalized weights created using the collaborative filter 207 for the one or more similar existing users. The personalized weights reflect their viewing preferences and behaviors of the one or more existing users. For example, the personalized weights for each existing user can include their favorite content items (i.e., channels or TV programs). The content items determiner 216 can apply these weights to a new user to generate content recommendations for the new user.

As a new user gradually builds a watch history on a platform of the streaming service, the new user can start to use the collaborative filter 207 for content recommendations.

Thus, the content filtering system 107 can recommend relevant content items for both new and existing users, overcoming the problems posed by the cold start problem.

Figure 3:
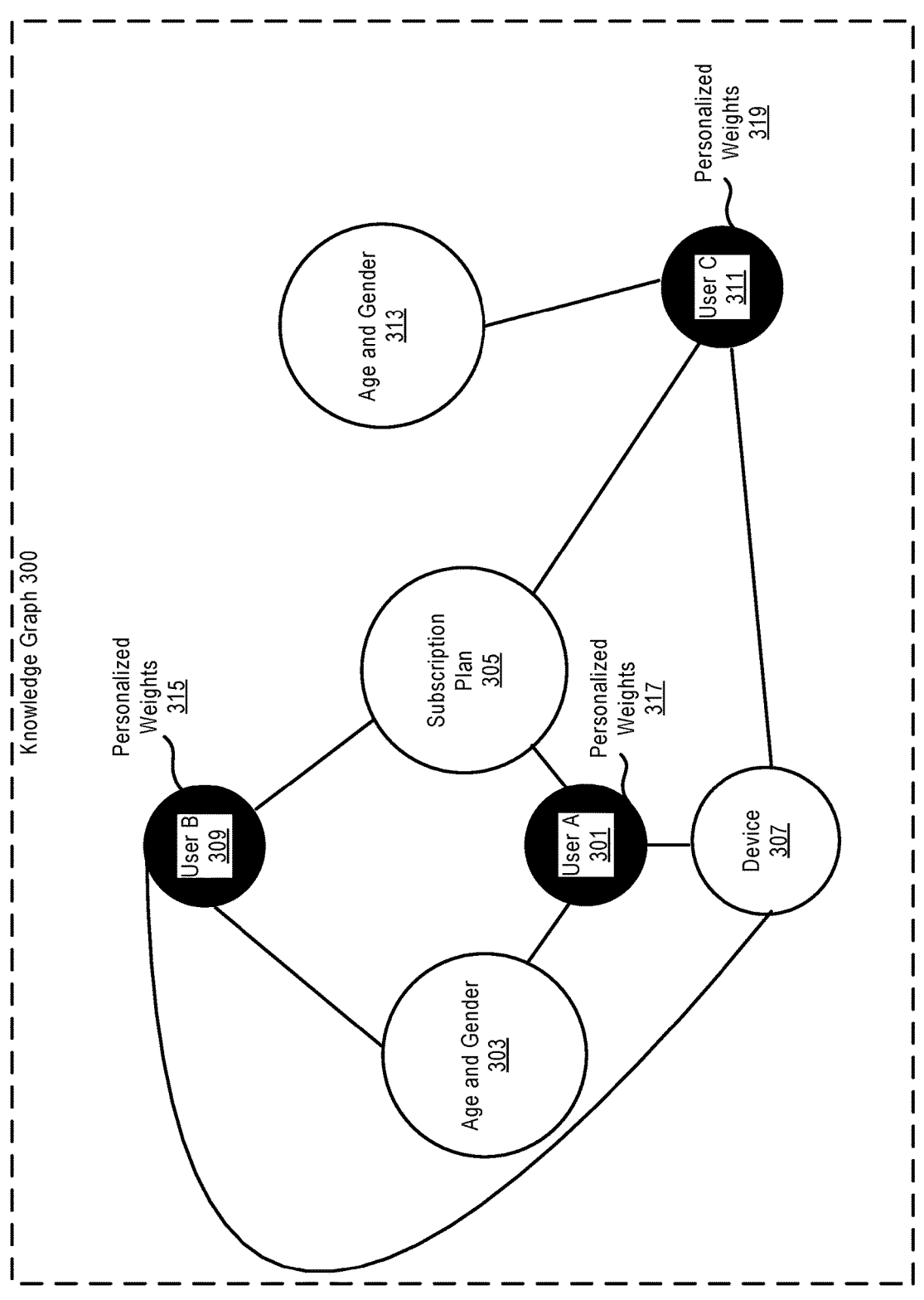
FIG. 3 is an example of a knowledge graph according to an embodiment of the disclosure.

FIG. 3 is an example 300 of the knowledge graph 212 according to an embodiment of the disclosure. The example knowledge graph 300 illustrated in FIG. 3 is a simplified version of the knowledge graph 212 and is provided here for the purpose of illustration. Therefore, the knowledge graph 300 has only three user nodes (i.e., user node A 301, user node B 309, and user node C 311) and each user node is directly connected to three other attributes nodes (i.e., an age and gender node, a subscription plan node, and a device used node). Relationships among the nodes indicate how they interact with each other. For example, each of the user nodes 301, 309, and 311 interacts with their age and gender nodes 303 and 313 through a "has an age and a gender" relationship; interacts with their subscription plan node 305 through "subscribes to" relationship; and interacts with their device node 307 through a "has a" relationship. Thus, the relationships indicated above illustrate that each user has an age and a gender, subscribes to a plan, and has a streaming device.

In an embodiment, although not shown in FIG. 3, each user node can have attributes as a name, a sign-up date, and contact information. Further each user node can have their respective sets of personalized weights 315, 317 and 319. Each set of personalized weights reflect the viewing preferences and viewing behaviors of the respective user. The viewing preferences can include which channels, and/or which types of programs the user has watched in a predetermined past period of time (e.g., in the last 60 days).

In an embodiment, values of each attribute nodes are also the values of a user node that is connected to that the attribute node. For example, the age and gender node 303 can have "male; 21-35" as its values; and the age and gender node 313 can have "female; 35-45" as its values. The device node 307 can have "smart phone" as its value, and the subscription plan node 305 can have "premium plan" as its values. Thus, the values of "male; 21-35" and "smart phone" are also values of user node A 301 because user node A is connected to the attribute nodes 303 and 307 having those values.

When two user nodes are connected to the same attribute node, the two user nodes share values of that attribute node. For example, both user node A 301 and user node B 309 are male and are between 21-35 years old because both user nodes 301 and 309 are connected to the same attribute node 303 that have the values of "male; 21-35". Similarly, all three user nodes 301, 309, and 311 subscribe to a premium plan because they are all connected to the subscription node 305 that possesses the value of "premium plan". It should be appreciated that there can be more nodes connected to each of the user nodes 301, 309, and 311. For example, the user nodes 301, 309, and 311 can connect to one or more income nodes and one or more marital status nodes.

In this knowledge graph 300, user node A 301 can be a new user, and user node B 309 and user node C 311 can be existing users. When one or more nodes from the existing nodes is found to be similar to user node A 301 based on a predetermined threshold, user node A 301 can align its personalized weights with the personalized weights of each of the one or more similar nodes in accordance with a predetermined algorithm. For example, in accordance with the predetermined algorithm, a new user (e.g., user node A 301) can assume all the personal weights of each of the one or more similar existing nodes or portions of each of the one or more existing nodes.

Figure 4:
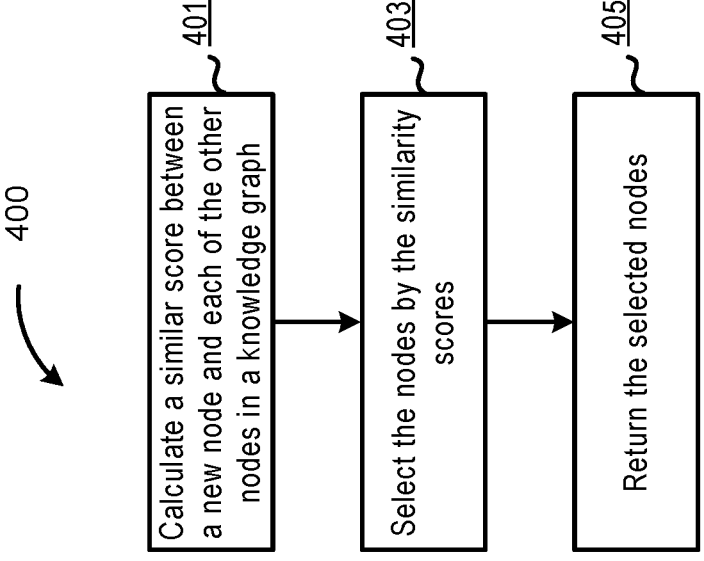
FIG. 4 is a block diagram illustrating a process of identifying existing users that are similar to a new user from a knowledge graph according to an embodiment of the disclosure.

FIG. 4 is a block diagram illustrating a process 400 of identifying existing users that are similar to a new user from a knowledge graph according to an embodiment of the disclosure. The process 400 can be performed by a processing logic that may comprise software, hardware, or a combination thereof. For example, the process 400 can be performed by the profile similarity identifier 214 described in FIG. 2.

At step 401, the processing logic calculates a similarity score between a new user and each existing user in the knowledge graph. The similarity score can be a cosine similarity measure between the new user and each existing user.

Referring to the illustrated knowledge graph 300, assume that the subsequent table provides a description of this knowledge graph 300.

TABLE 1

| Node | Age | Gender | Device | Subscription Plan |
|------|-----|--------|--------|-------------------|
| User A 301 | 30 | Male | Smart Phone | Premium |
| User B 309 | 29 | Male | Smart Phone | Premium |
| User C 311 | 44 | Female | Smart Phone | Premium |

To calculate a similarity score between two user nodes, the following formula can be used: similarity=cosine_similarity(node_id,node), where node_id represents a node for a new user (i.e., user node A 301) and node is an existing node in the knowledge graph 300. The cosine similarity measure is calculated as follows: cosine_similarity (node_id, node)=dot(node_id, node)/ (||node_id||*||node||), where dot is the dot product operator and ||node|| is the magnitude of a node vector. The node vector for a node contains the values of that node. For example, the node vector for user node A 301 would be: node_vector_A_301=[30, Male, Smart Phone, Premium].

In an embodiment, the magnitude of a vector is the length of the vector that can be calculated by taking the square root of the sum of the squares of the elements of the vector. For example, to calculate the magnitude of the vector node_vec-tor_A_301=[30, Male, Smart Phone, Premium], the process-ing logic can use the following formula: $magnitude=sqrt(30^2+Male^2+Smart Phone^2+Premium^2$, where 30, Male, Smart Phone, and Premium are the values of the Age, Gender, Device, and Subscription Plan attributes for user node A 301, respectively. The values of Male, Smart Phone, and Premium can be represented as numbers. For example, Male can be presented as 1 and Female as 0, or Smart Phone can be represented as 1 and Desktop as 0.

Once the categorical attributes of nodes are converted to numbers, the processing logic can calculate the magnitude of the vector using the formula above.

Using the cosine similarity formula and the values in the Table 1, the processing logic can calculate the similarity score between user node A 301 and all other nodes in the knowledge graph 300. Table 2 below shows the similarity scores between user node A 301 and all other nodes in the knowledge graph 300:

TABLE 2

| Node | Similarity Score |
|------|------------------|
| User B 309 | 0.92 |
| User C 311 | 0.79 |

At step 403, the processing logic selects one or more nodes based on the similarity scores. Only those nodes having similarity score greater than a given threshold are selected. For example, if the threshold is set to 0.8, only user node B 309 would be selected because only that node has a similar score of at least 0.8 to user node A 301.

At step 405, the processing logic returns the selected node. In this case, the returned node is user node B 309.

While the process 400 is illustrated using the example knowledge graph 300, actual implementations of the process 400 may encompass a larger number of user nodes, with each node potentially associated with multiple entities. Additionally, in one embodiment, the processing logic may return multiple selected nodes. For instance, the three nodes exhibiting the highest similarity scores to a new user might be returned, irrespective of any threshold considerations.

Figure 5:
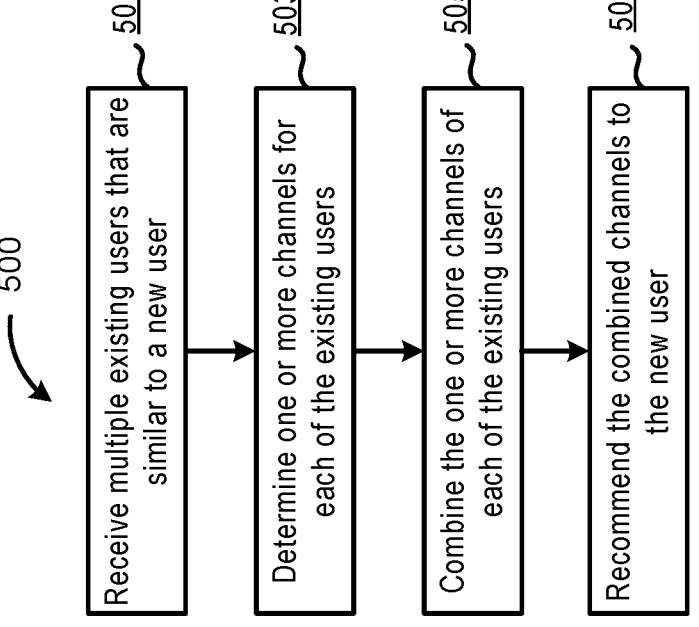
FIG. 5 is a block diagram illustrating a process of determining recommended channels from similar users according to an embodiment of the disclosure.

FIG. 5 is a block diagram illustrating a process 500 of determining recommended channels from similar existing users according to an embodiment of the disclosure. The process 500 can be performed by a processing logic, which may comprise software, hardware, and a combination thereof. For example, the process 500 can be performed by the content items determiner 216 described in FIG. 2.

Referring to FIG. 5, at step 501, the processing logic receives multiple existing users that have been determined to be similar to a new user using the process 400.

At step 503, the processing logic identifies one or more channels for each existing user. The one or more channels can be defined as, for example, the top three, five, or any other specified number of channels that the existing user has viewed the most during a predetermined period (e.g., the last 60 days). Alternatively, the one or more channels may be recommended by the collaborative filter 207.

At step 505, the processing logic combines the one or more channels for each existing user. Any duplicate channels are removed from the combined channels. The combined channels include all channels identified for each identified existing user at step 503 except for duplicate channels.

At step 507, the processing logic recommends the combined channels to the new user.

In an embodiment, the process 400 and the process 500 can be performed to recommend channels to new users who have no established watch history for the collaborative filter 207 to generate meaningful recommendations. As the new user continues to watch programs, thus generating watch activity, the new user would become an existing user and the collaborative filter 207 can be used to directly recommend channels and/or programs to the new user.

FIG. 6 is a block diagram illustrating a process 600 of recommending channels to new users according to an embodiment of the disclosure. The process 600 can be performed by a processing logic, which may comprise software, hardware, and a combination thereof. For example, the process 600 can be performed by the content items determiner 216 described in FIG. 2.

At step 601, the processing logic identifies, from a plurality of existing users of a streaming service, one or more existing users that each are similar to a new user of the streaming service based on their respective profiles. The existing users and the new user, together with their attributes in their respective profiles, are represented on a knowledge graph. The identifying of the one or more similar existing users can be determined based on their respective similarity scores to the new user.

At step 603, the processing logic identifies one or more channels recommended to each of the one or more identified existing users. The one or more channels is recommended to each identified existing users by a collaborative filter, such as the collaborative filter 207 described in FIG. 2.

At step 605, the processing logic displays, on a streaming device of the new user, at least one channel of combined channels of the one or more channels recommended to each of the one or more identified existing users.

Figure 7:
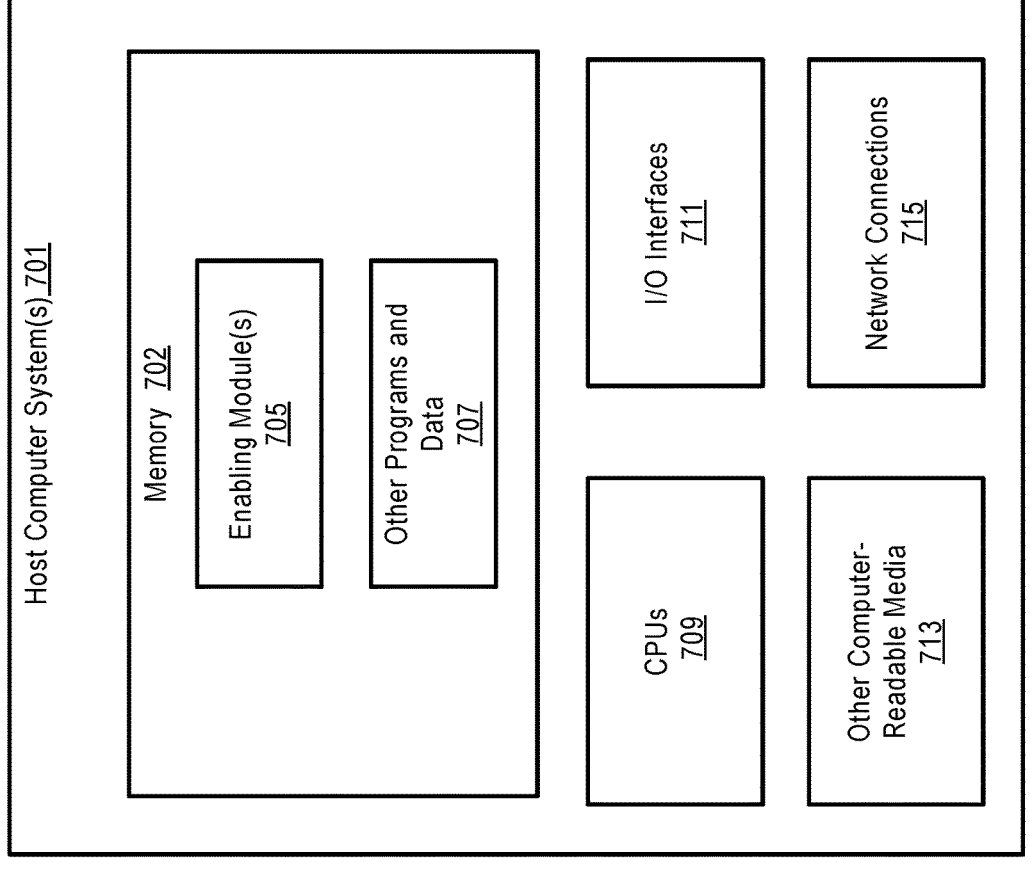
FIG. 7 shows a system diagram that describes an example implementation of a computing system(s) for implementing embodiments described herein.

FIG. 7 shows a system diagram that describes an example implementation of a computing system(s) for implementing embodiments described herein.

The functionality described herein can be implemented either on dedicated hardware, as a software instance running on dedicated hardware, or as a virtualized function instantiated on an appropriate platform, e.g., a cloud infrastructure. In some embodiments, such functionality can be completely software-based and is designed as cloud-native, meaning that they are agnostic to the underlying cloud infrastructure, allowing higher deployment agility and flexibility. However, FIG. 7 illustrates an example of underlying hardware on which such software and functionality can be hosted and/or implemented.

In this embodiment, an example host computer system(s) 701 is used to represent one or more of those in various components shown and/or described herein that are, or that host or implement the functions of: cloud servers, streaming devices, components, microservices, machine learning models, and/or other aspects described herein, as applicable, for recommending channels to a new user in a streaming service. In some embodiments, one or more special-purpose computing systems can be used to implement the functionality described herein. Accordingly, various embodiments described herein can be implemented in software, hardware, firmware, or in some combination thereof. Host computer system(s) 701 can include memory 702, one or more central processing units (CPUs) 709, I/O interfaces 711, other computer-readable media 713, and network connections 715.

Memory 702 can include one or more various types of non-volatile (non-transitory) and/or volatile (transitory) storage technologies. Examples of memory 702 can include, but are not limited to, flash memory, hard disk drives, optical drives, solid-state drives, various types of random-access memory (RAM), various types of read-only memory (ROM), neural networks, other computer-readable storage media (also referred to as processor-readable storage media), or the like, or any combination thereof. Memory 702 can be utilized to store information, including computer-readable instructions that are utilized by CPU 709 to perform actions, including those of embodiments described herein.

Memory 702 can have stored thereon enabling module(s) 705 that can be configured to implement and/or perform some or all of the functions of the systems, components and modules described herein. Memory 702 can also store other programs and data 707, which can include rules, databases, application programming interfaces (APIs), software containers, nodes, pods, clusters, node groups, control planes, software defined data centers (SDDCs), microservices, virtualized environments, software platforms, cloud computing service software, network management software), artificial intelligence (AI) or machine learning (ML) programs or models to perform the functionality described herein, user interfaces, operating systems, etc.

Network connections 715 are configured to communicate with other computing devices to facilitate the functionality described herein. In various embodiments, the network connections 715 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 711 can include video interfaces, other data input or output interfaces, or the like. Other computer-readable media 713 can include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A method comprising:

identifying, from a plurality of existing users of a streaming service, one or more existing users that each is similar to a new user of the streaming service based on respective profiles of the one or more identified existing users;

identifying one or more channels recommended to each of the one or more identified existing users; and displaying, on a streaming device of the new user, at least one channel of the one or more channels recommended to each of the one or more identified existing users;

wherein:

the identifying of the one or more existing users comprises identifying the one or more existing users on a knowledge graph comprising both individual user nodes and attribute nodes connected to the individual user nodes by edges representing relationships between the attribute nodes and the individual user nodes;

each of the individual user nodes represents an individual user of the plurality of existing users or the new user; and the knowledge graph is structured such that any edge between a specific attribute node and a specific user node indicates that a specific user specified by the specific user node has a demographic or subscription attribute value specified by the attribute node.

2. The method of claim 1, wherein the new user is a user that signed up for the streaming service within a predetermined past period, and wherein each of the plurality of existing users signed up for the streaming service prior to the predetermined past period.

3. The method of claim 1, wherein the identifying of the one or more existing users on the knowledge graph further includes:

calculating a similarity score for each of the plurality of existing users to the new user; and selecting the one or more existing users based on their respective similarity scores exceeding a predetermined threshold.

4. The method of claim 3, wherein the similarity score is calculated based on attributes of the new user and attributes of each respective existing user of the plurality of existing users, wherein the attributes of the new user or each existing user is included in their respective profiles.

5. The method of claim 4, wherein the attributes of the new user or each existing user include one or more of: age, gender, income, ethnicity, marital status, subscription plan, and streaming device used.

6. The method of claim 1, wherein the identifying of the one or more existing users on the knowledge graph further includes:

calculating a similarity score of each of the plurality of existing users on the knowledge graph to the new user;

setting a threshold number of existing users to be selected;

selecting a number of similarity scores that is equal to the threshold number; and determining existing users associated with the number of selected similarity scores.

7. The method of claim 1, wherein the streaming service is an application-based television service that streams live television and on-demand content over the internet.

8. A system comprising:

one or more processors; and one or more memories that are coupled to the one or more processors and storing program instructions that, when executed by the one or more processors, cause the system to perform operations comprising:

identifying, from a plurality of existing users of a streaming service, one or more existing users that each is similar to a new user of the streaming service based on respective profiles of the one or more identified existing users;

identifying one or more channels recommended to each of the one or more identified existing users; and displaying, on a streaming device of the new user, at least one channel of the one or more channels recommended to each of the one or more identified existing users;

wherein:

the identifying of the one or more existing users comprises identifying the one or more existing users on a knowledge graph comprising both individual user nodes and attribute nodes connected to the individual user nodes by edges representing relationships between the attribute nodes and the individual user nodes;

each of the individual user nodes represents an individual user of the plurality of existing users or the new user; and the knowledge graph is structured such that any edge between a specific attribute node and a specific user node indicates that a specific user specified by the specific user node has a demographic or subscription attribute value specified by the attribute node.

9. The system of claim 8, wherein the new user is a user that signed up for the streaming service within a predetermined past period, and wherein each of the plurality of existing users signed up for the streaming service prior to the predetermined past period.

10. The system of claim 8, wherein the identifying of the one or more existing users on the knowledge graph further includes:

calculating a similarity score for each of the plurality of existing users to the new user; and selecting the one or more existing users based on their respective similarity scores exceeding a predetermined threshold.

11. The system of claim 10, wherein the similarity score is calculated based on attributes of the new user and attributes of each respective existing user of the plurality of existing users, wherein the attributes of the new user or each existing user is included in their respective profiles.

12. The system of claim 11, wherein the attributes of the new user or each existing user include one or more of: age, gender, income, ethnicity, marital status, subscription plan, and streaming device used.

13. The system of claim 8, wherein the identifying of the one or more existing users on the knowledge graph further includes:

calculating a similarity score of each of the plurality of existing users on the knowledge graph to the new user;

setting a threshold number of existing users to be selected;

selecting a number of similarity scores that is equal to the threshold number; and determining existing users associated with the number of selected similarity scores.

14. The system of claim 8, wherein the streaming service is an application-based television service that streams live television and on-demand content over the internet.

15. A non-transitory computer readable storage medium storing program instructions that, when executed by one or more processors, cause the one or more processors to perform operations comprising:

identifying, from a plurality of existing users of a streaming service, one or more existing users that each is similar to a new user of the streaming service based on respective profiles of the one or more identified existing users;

identifying one or more channels recommended to each of the one or more identified existing users; and displaying, on a streaming device of the new user, at least one channel of the one or more channels recommended to each of the one or more identified existing users;

wherein:

the identifying of the one or more existing users comprises identifying the one or more existing users on a knowledge graph comprising both individual user nodes and attribute nodes connected to the individual user nodes by edges representing relationships between the attribute nodes and the individual user nodes;

each of the individual user nodes represents an individual user of the plurality of existing users or the new user; and the knowledge graph is structured such that any edge between a specific attribute node and a specific user node indicates that a specific user specified by the specific user node has a demographic or subscription attribute value specified by the attribute node.

16. The non-transitory computer readable storage medium of claim 15, wherein the new user is a user that signed up for the streaming service within a predetermined past period, and wherein each of the plurality of existing users signed up for the streaming service prior to the predetermined past period.

17. The non-transitory computer readable storage medium of claim 15, wherein the identifying of the one or more existing users on the knowledge graph further includes:

calculating a similarity score for each of the plurality of existing users to the new user; and selecting the one or more existing users based on their respective similarity scores exceeding a predetermined threshold.

* * * * *